June 21, 1932.  G. W. HEISE  1,863,791
ELECTRIC CELL
Filed May 29, 1928
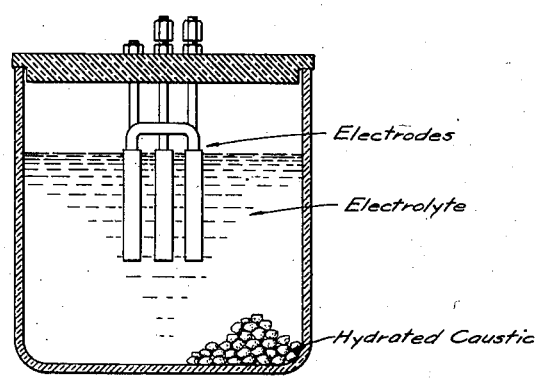
Inventor:
George W. Heise,
By Byrnes Townsend & Brickenstein,
Attorneys Patented June 21, 1932

1,863,791

UNITED STATES PATENT OFFICE

GEORGE W. HEISE, OF LAKEWOOD, OHIO, ASSIGNOR TO NATIONAL CARBON CO., INC., A CORPORATION OF NEW YORK

ELECTRIC CELL

Application filed May 29, 1928. Serial No. 281,459.

My invention relates to electric cells, particularly to those having a caustic electrolyte, and to new methods of preparation of such electrolytes. One of the principal objects of my invention is the provision of a new and convenient dry material from which to prepare a caustic electrolyte. Other objects are to reduce the time required for solution thereof, to facilitate shipment, etc.

A convenient pimary battery, well adapted to such fields of use as railway signal service and in other services where a battery or cell is used in a closed circuit, is produced by inserting a zinc electode and an electrode having a depolarizer mass of copper oxide, into a relatively strong solution of caustic alkali contained in a suitable vessel. For certain purposes it is desirable that the cell assembly should be approximately complete, except for the fluid, at the factory in order that it may be shipped to the point of usage, and there prepared for service by the addition of water only. It has been found that if the assembly is completed, and the various parts permanently assembled at the factory, including the usual dry caustic material, either fused, or granulated, for the electrolyte, within the vessel, with only a small opening for the introduction of water to prepare the cell for use, an amount of care is required in the peparation for sevice which cannot be reliably obtained fom the ordinary mechanic in the field. It is found that with such a completely assembled cell, the adding of the requisite quantity of water to the usual dry caustic in the container causes the evolution of a quantity of heat which may result in the formation of a mass of solid material in the bottom of the cell which dissolves only very slowly. A cell so prepared for use may not obtain complete solution of the caustic material nor full efficiency in a period of several days. Likewise the high temperature locally produced requires special care to avoid injury to or breakage of the containing vessel, if made of glass, or in some cases, to electrodes agglomerated or water-proofed with heat-sensitive materials.

My invention provides a new and useful form of caustic material for the electrolyte which does not liberate as large a quantity of heat upon admixture with water, and which does not tend to fuse into a solid mass, and which does not produce an amount of heat injurious to the container or to the electrodes.

Other objects and details of my invention will be apparent from the following description when read in connection with the accompanying drawing wherein;

The single figure is a diagrammatic representation of the elements of a battery embodying my invention.

I find that a hydrated caustic substance suitable for my invention may be produced by the combination of a solid anhydrous alkali hydroxide with a suitable amount of water. If sodium hydroxide is used, the water should be approximately a quantity equivalent to not over about 45 percent by weight of the caustic sodium hydroxide. A mixture of caustic soda and water in this proportion evolves a large quantity of heat and forms a liquid which, upon cooling, hardens to a dry solid having the approximate formula:

$$NaOH \cdot H_2O$$

This may be considered as the monohydrate of sodium hydroxide and may be formed by the above described method, or in any other convenient way as by discontinuing the dehydration of the original caustic soda at an appropriate point. The material, whch is hard and dense and dissovles readily in water may be used in agglomerated form for battery electrolyte. It may also desirably be crushed after solidifying, or, if stirred during the cooling process it may be produced directly in granules of convenient size. The resultant granular product is highly desirable for use in the preparation of battery electrolyte to avoid the above described disadvantages. It is likewise non-dusting and upon solution produces a much less quantity of heat. It is found that when the monohydrate is dissolved in water to produce the desirable 20% to 25% solution of caustic for the battery, the solution temperature may be approximately 30° C. lower than the temperature obtained under similar conditions by the use of anhydrous caustic.

In the utilization of my invention the caustic may be prepared in the monohydrate form, as above described. The battery may then be assembled with the desired quantity of caustic in the container which may then be permanently closed, except for a filling opening, which may be temporarily closed with a convenient stopper. The completely assembled battery may then be shipped to the user who, upon need of the cell, may withdraw the stopper and insert the necessary quantity of water and reinsert the stopper. The caustic thereupon dissolves in the water solution without injury to any electrodes which may be included and without danger or injury to the container or other parts. It is not necessary that any special care be taken to insure complete solution of the caustic, and a minimum of stirring, shaking or other agitation is necessary to insure the complete solution of the caustic to yield an electrolyte of the necessary concentration and uniformity.

The preparation of my invention is likewise very desirable for use in cells which are not shipped in completely assembled form, but in parts ready for assembly, since it may readily be packed for shipment separately from the other cell parts; when added to water by the user no caustic dust is caused to fly about to the injury of the lungs of those nearby; the amount of agitation required to produce a uniform solution is minimized and time is saved; no solid fused masses are formed, and the electrolyte can be used immediately without an intermediate cooling period.

The previously described embodiment discloses my invention as applied to a primary battery in which caustic soda, sodium hydroxide, is utilized as the electrolyte. It is equally applicable to a battery in which potassium hydroxide, caustic potash, is used. In this alternative embodiment a different proportion of water may be required to produce a suitable material approximating the monohydrate. This proportion is however, readily computed from the relative molecular weights of the substances involved.

Similarly mixtures of alkali materials may be used in an analogous way, and such substances as lithium hydroxide may likewise be included.

My invention is likewise applicable to other caustic electrolyte cells than those in which a copper oxide depolarizer is used, such as the zinc carbon cell in which the cathode is depolarized by air as well as in other types.

It may likewise be applicable, in certain conditions, to other types of cells than the primary cells, such as the so-called "Edison" storage cell.

In the foregoing paragraphs, I have described my invention as utilizing, in a caustic alkali electrolyte cell, a monohydrate of the caustic, alkali, material. I desire that this be understood to means a material composed principally of the monohydrate, since it is not essential to my invention that the material contain only the monohydrate. It may not be commercially convenient to produce a material in which the included water is in such proportion and combination as to produce exactly and only the monohydrate. I find that satisfactory results are obtained when the amount of contained water is somewhat less than sufficient to convert all of the material to the monohydrate form and some caustic remains present in the unhydrated form. Likewise satisfactory results are obtained if the included water is present in excess over the proportion required to form the monohydrate, provided that the excess of water is less than the amount required to develop a stickiness in the material. It is possible that other hydrates than the monohydrate are formed, or that the moisture is present in other forms than as the monohydrate, but whatever the form, in terms of chemical theory, in which the moisture occurs, the technical effect is that above disclosed. Accordingly it is desired that when the words "caustic hydrate, or monohydrate" occur, they be understood to mean a material comprising an alkali hydroxide, and a proportion of water approximating one molecular weight to each molecular weight of caustic material.

By this means I have thus provided a step in the assembling of a caustic alkali battery whereby previous difficulties have been substantially reduced, and a new, useful and important gain in convenience, easy of operation, and simplicity has been obtained.

While I have shown but a single embodiment of my invention, it is capable of still other modifications therefrom without departure from the spirit thereof and it is desired therefore that only such limitations shall be imposed upon the appended claims as are required by the prior art or indicated therein.

I claim as my invention:

1. In a battery cell assembly comprising positive and negative electrodes, and a container, an electrolyte material comprising essentially a solid soluble hydrate of an alkali hydroxide.

2. In a battery cell assembly comprising positive and negative electrodes, and a container, an electrolyte material comprising principally a solid soluble approximately monohydrate of caustic soda.

In testimony whereof, I affix my signature.

GEORGE W. HEISE.